US012526029B2

United States Patent
Li

(10) Patent No.: US 12,526,029 B2
(45) Date of Patent: Jan. 13, 2026

(54) COMMUNICATION METHOD AND DEVICE

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 386 days.

(21) Appl. No.: 17/916,561

(22) PCT Filed: Apr. 3, 2020

(86) PCT No.: PCT/CN2020/083322
§ 371 (c)(1),
(2) Date: Sep. 30, 2022

(87) PCT Pub. No.: WO2021/196214
PCT Pub. Date: Oct. 7, 2021

(65) Prior Publication Data
US 2023/0156721 A1    May 18, 2023

(51) Int. Cl.
*H04W 72/23* (2023.01)
*H04B 7/06* (2006.01)
*H04L 1/1812* (2023.01)
*H04W 16/28* (2009.01)
*H04W 72/044* (2023.01)
*H04W 72/21* (2023.01)

(52) U.S. Cl.
CPC ....... *H04B 7/06952* (2023.05); *H04L 1/1812* (2013.01); *H04W 16/28* (2013.01); *H04W 72/046* (2013.01); *H04W 72/21* (2023.01); *H04W 72/23* (2023.01)

(58) Field of Classification Search
CPC ... H04W 72/23; H04W 16/28; H04W 72/046; H04W 72/21; H04W 72/232; H04W 24/02; H04L 1/1812; H04L 5/0023; H04L 5/0053; H04B 7/024; H04B 7/0695
See application file for complete search history.

(56) References Cited

U.S. PATENT DOCUMENTS

2012/0157140 A1    6/2012    Kim et al.
2018/0254863 A1    9/2018    Choi et al.
(Continued)

FOREIGN PATENT DOCUMENTS

CN    104488320 A    4/2015
CN    108809480 A    11/2018
(Continued)

OTHER PUBLICATIONS

Indian Office Action issued to Indian Application No. 202247062381 dated Jun. 27, 2023 with partial English translation, (6p).
(Continued)

*Primary Examiner* — Romani Ohri
(74) *Attorney, Agent, or Firm* — Arch & Lake LLP; Hao Tan; Shen Wang

(57) ABSTRACT

A communication method includes: receiving, by a user equipment (UE), first DCI of a neighboring cell, receiving, by the UE, configuration information of the neighboring cell from a serving cell, and communicating, by the UE, with the neighboring cell based on the first DCI and the configuration information of the neighboring cell.

17 Claims, 5 Drawing Sheets

(56) References Cited

U.S. PATENT DOCUMENTS

| | | | |
|---|---|---|---|
| 2018/0376438 A1* | 12/2018 | Islam | H04W 72/046 |
| 2019/0124631 A1* | 4/2019 | Ren | H04L 5/0048 |
| 2020/0037305 A1 | 1/2020 | Yang et al. | |
| 2020/0044705 A1 | 2/2020 | Sridharan et al. | |
| 2020/0314880 A1* | 10/2020 | Cirik | H04W 72/1273 |
| 2020/0389805 A1* | 12/2020 | Kim | H04W 72/23 |
| 2022/0158775 A1* | 5/2022 | Xiong | H04L 1/1864 |
| 2022/0369353 A1* | 11/2022 | Nimbalker | H04L 5/0044 |

FOREIGN PATENT DOCUMENTS

| | | |
|---|---|---|
| CN | 109274470 A | 1/2019 |
| CN | 114342468 A | 4/2022 |
| WO | 2021180156 A1 | 9/2021 |

OTHER PUBLICATIONS

International Search Report of PCT/CN2020/083322 dated Dec. 29, 2020, (4p).
Search Report for EP application No. 20928637.6, dated Nov. 24, 2023 (38p).
Qualcomm Incorporated, "Multi-TRP Enhancements", 3GPP TSG-RAN WG1 Meeting #98bis, Oct. 14-20, 2019, Chongqing, China (26p).
International Search Report for PCT application No. PCT/CN2022/090790, dated Dec. 16, 2022 (19p).
Intel Corporation, "On multi-TRP/multi-panel transmission", 3GPP TSG RAN WG1 Meeting #98b, R1-1910668, Chongqing, China, Oct. 14-20, 2019, (15p).

* cited by examiner receiving first DCI of a neighboring cell, receiving configuration information of the neighboring cell from a serving cell, and communicating with the neighboring cell based on the first DCI and the configuration information of the neighboring cell — S11 receiving second DCI of the serving cell, and communicating with the serving cell based on the second DCI — S12

COMMUNICATION METHOD AND DEVICE

CROSS-REFERENCE TO RELATED APPLICATION

This application is the U.S. national phase of International Application No. PCT/CN2020/083322, filed on Apr. 3, 2020, the content of which is hereby incorporated by reference in its entirety into this disclosure for all purposes.

TECHNICAL FIELD

The disclosure relates to communication technologies, in particular to a communication method, a communication device and a computer storage medium.

BACKGROUND

In the new radio (NR) system of the $5^{th}$ generation (5G) mobile network or 5G wireless system, beam-based transmission and reception are required because high frequency channels attenuate faster, so as to guarantee the coverage. This is especially true for communication frequency bands above 6 GHz.

SUMMARY

According to a first aspect of the disclosure, a communication method applicable to a UE is provided. The method includes: receiving first downlink control information (DCI) of a neighboring cell, receiving configuration information of the neighboring cell from a serving cell, and communicating with the neighboring cell based on the first DCI and the configuration information of the neighboring cell.

According to a second aspect of the disclosure, a communication method applicable to a network device is provided. The method includes: transmitting first DCI to a UE via a neighboring cell; transmitting configuration information of the neighboring cell to the UE via a serving cell; and communicating with the UE via the neighboring cell based on the first DCI and the configuration information of the neighboring cell.

According to a third aspect of the disclosure, a communication device applicable to a UE is provided. The device includes: a processor; and a memory for storing executable instructions; in which, the processor is configured to perform any above described communication method applicable to the UE side in the first aspect of the disclosure.

It should be understood that the above general description and the following detailed description are only exemplary and explanatory, and may not limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a", "said" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used in this disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the terms "if" and "in case" as used herein can be interpreted as "when", "while" or "in response to determining".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figures 1, 2:
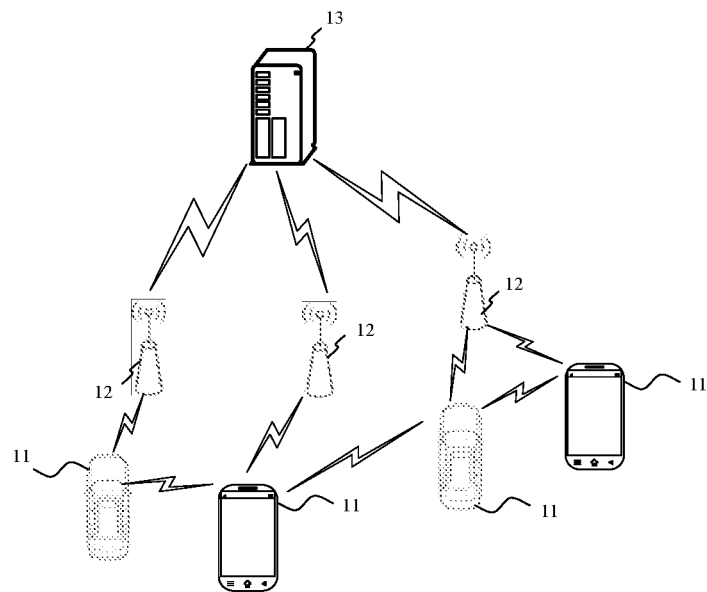
FIG. 1 is a schematic diagram of a wireless communication system according to some examples.
FIG. 2 is a first flowchart of a communication method according to some examples.

FIG. 1 is a schematic diagram of a wireless communication system according to some examples. As illustrated in FIG. 1, the wireless communication system is a communication system based on cellular mobile communication technologies, and the wireless communication system may include terminals 11 and base stations 12.

The terminal 11 may be a device that provides voice and/or data connectivity to a user. The terminal 11 may communicate with at least one core networks via a radio access network (RAN). The terminal 11 may be an internet of things (IoT) terminal, such as a sensor device, a mobile phone (or "cellular" phone) and a computer with an IoT terminal. For example, the terminal 11 may be a fixed, portable, pocket, hand-held, computer built-in or a vehicle-mounted device, such as, a station (STA), a subscriber unit, a subscriber station, a mobile station, a mobile, a remote station, an access point, a remote terminal, an access terminal, a user terminal, a user agent, a user device, or a UE. Or, the terminal 11 may also be a device of an unmanned aerial vehicle. Or, the terminal 11 may also be a vehicle-mounted device, for example, an engine control unit (ECU) with a wireless communication function, or a wireless communication device externally connected to the ECU. Or, the terminal 11 may also be a roadside device, for example, a street light, a signal light, or other roadside devices having a wireless communication function.

The base station 12 may be a network device side in the wireless communication system. The wireless communication system may be a 4G system (i.e., fourth generation mobile communication technology system), also known as a long term evolution (LTE) system. Or, the wireless communication system may also be a 5G system, also known as a NR system or 5G NR system. Or, the wireless communication system may also be a next-generation system of the 5G system. The access network in the 5G system may be called a new generation-radio access network (NG-RAN), or a machine-type communication (MTC) system.

The base station 12 may be an evolved base station (eNB) employed in the 4G system. Or, the base station 12 may also be a base station (gNB) that adopts a centralized distributed architecture in the 5G system. When the base station 12 adopts the centralized distributed architecture, it usually includes a central unit (CU) and at least two distributed units (DUs). The CU is provided with protocol stacks of a packet data convergence protocol (PDCP) layer, a radio link control (RLC) layer, and a media access control (MAC) layer. A physical (PHY) layer protocol stack is set in the DU. The specific implementation of the base station 12 is not limited in some examples of the disclosure.

A wireless connection can be generated between the base station 12 and the terminal 11 through a radio air interface. In different examples, the radio air interface is a radio air interface based on the 4G standard. Or, the radio air interface is a radio air interface based on the 5G standard, such as, a NR. Or, the radio air interface may also be a radio air interface based on a next generation of the 5G standard.

In some examples, an end to end (E2E) connection may also be generated between the terminals 11, for example, scenes of vehicle to vehicle (V2V) communication, vehicle to infrastructure (V2I) communication and vehicle to pedestrian (V2P) communication in vehicle to everything (V2X) communication.

In some examples, the above wireless communication system may further include a network management device 13.

A plurality of base stations 12 are connected to the network management device 13 respectively. The network management device 13 may be a core network device in the wireless communication system, for example, the network management device 13 may be a mobility management entity (MME) in an evolved packet core (EPC). Or, the network management device may also be other core network devices, such as a serving gate way (SGW), a public data network gate way (PGW), a policy and charging rules function (PCRF) or a home subscriber server (HSS). The implementation form of the network management device 13 is not limited in some examples of the disclosure.

In the above wireless communication system, when the UE has multiple panels, the UE can obtain the better throughput when using multiple panels to communicate with multiple cells simultaneously. Moreover, examples of the method of the disclosure are provided for performing beam-based transmission/reception for control channels and data channels between the UE and the neighboring cell.

Examples provide a communication method. As illustrated in FIG. 2, the communication method is applicable to a UE and the method includes the following.

At block S11, first DCI of a neighboring cell is received, configuration information of the neighboring cell is received from a serving cell, and communicating with the neighboring cell is based on the first DCI and the configuration information of the neighboring cell.

In some examples, the method further includes the following.

At block S12, second DCI of the serving cell is received, and communicating with the serving cell is based on the second DCI.

It should be noted that when the method includes step S11 and step S12, step S11 may be performed first, or step S12 may be performed first, or both step S11 and step S12 may be performed simultaneously. In some examples, there is no specific limitation on the order in which the UE receives the DCI transmitted by the serving cell and the DCI transmitted by the neighboring cell, nor on the order in which the UE communicates with the serving cell and communicates with the neighboring cell, which may be implemented according to different scenarios.

In this way, the UE receives the first DCI from the neighboring cell and the second DCI from the serving cell respectively. Compared to the UE receiving the DCI from the serving cell and the DCI being required to indicate transmission/reception resources between the neighboring cell and the UE, the signaling interaction between the serving cell and the neighboring cell is reduced, thereby reducing the impact of delay during the signaling interaction between different cells. The UE receives the configuration information of the neighboring cell from the serving cell, and communicates with the neighboring cell based on the first DCI and the configuration information of the neighboring cell, and communicates with the serving cell based on the second DCI, so that multiple panels in multiple cells can dynamically switch beams when simultaneously transmitting to/receiving from the UE to communicate with the UE, thereby increasing the throughput of the UE.

In some examples, the first DCI carries first beam information for communicating with the neighboring cell, and the second DCI carries second beam information for communicating with the serving cell.

The first beam information is indicated by a transmission configuration indication (TCI) state or spatial relation information; and the second beam information is indicated by a TCI states or spatial relation information.

In the above solution, the configuration information of the neighboring cell includes at least one of the following: a cell index of the neighboring cell or a sequence indicating the cell index; a device index allocated by the neighboring cell to the UE, in which the device index is configured to distinguish the UE from other UEs located in the neighboring cell; configuration information for the UE to receive physical downlink control channel (PDCCH) information from the neighboring cell; configuration information for the UE to receive physical downlink shared channel (PDSCH)

information from the neighboring cell; configuration information for the UE to transmit physical uplink control channel (PUCCH) information to the neighboring cell; or configuration information for the UE to transmit physical uplink shared channel (PUSCH) information to the neighboring cell.

Some examples do not limit the sequence indicating the cell index. For example, the sequence may be a scrambling sequence.

In some examples, the device index can be represented by UE_index. The UE_index allocated to the UE by the neighboring cell may be identical to or different from the UE_index of the UE in the serving cell. If the UE_index of the UE in the serving cell is X, and X has not been used by other UEs in the neighboring cell, the neighboring cell can also allocate X to the UE. If X has been used by other UEs in the neighboring cell, the neighboring cell can allocate another unused index to the UE.

In some examples, PDCCH-Config represents the configuration information for the UE to receive the PDCCH information of the neighboring cell, and the PDCCH-Config includes but not limited to control resource set (COREST) related information or search space related information.

In one case, in order to configure the UE to receive the PDCCH of the neighboring cell, when configuring the CORESET, it is necessary to configure the CORESET for the UE to receive the PDCCH of the neighboring cell, and the CORESET cell index and/or CORESET pool index is different from the CORESET cell index and/or CORESET pool index of the serving cell. Traditionally, each CORESET is configured with only one CORESET pool index and the value of the CORESET pool index is 0 or 1. In order to distinguish between the CORESET of the serving cell and the CORESET of the neighboring cell, there are two manners.

In manner 1, the value of the CORESET pool index of the serving cell is 0 or 1, and the value of the CORESET pool index of the neighboring cell is a value other than 0 and 1, for example, 2 or 3.

In manner 2, a new parameter is configured for CORESET, i.e., cell index. The cell index can be the absolute value of the cell index of the serving cell or neighboring cell, e.g. physical cell ID (PCI) value, or it can be a differentiated value of the serving cell or neighboring cell. For example, the value of the cell index of the serving cell is 0 and the value of the cell index of the neighboring cell is 1 or 2, as long as the value is not 0. In this case, since the value of the cell index can be distinguished, the CORESET pool index of the serving cell and the CORESET pool index of the neighboring cell can have the same range of values.

In one case, in order to configure the UE to receive beam information of the PDCCH of the neighboring cell, the list of TCI states of the PDCCH is configured using a radio resource control (RRC) signaling, and one of the TCI states is activated using a medium access control (MAC) control element (CE) signaling, where the activated TCI state is the corresponding receiving beam of the PDCCH.

It should be noted that if PDCCH-Config is not configured, the UE receives the PDCCH information using the same configuration as the serving cell by default.

In some examples, PDSCH-Config represents the configuration information for the UE to receive the PDSCH information of the neighboring cell, PDSCH includes at least one of the following: an data scrambling identity for the PDSCH (dataScramblingIdentityPDSCH), a scrambling sequence corresponding to the scrambling identity, demodulation reference signal (DMRS) configuration for the PDSCH, a list of TCI states (RRC signaling configuration), a TCI state activated by an MAC CE, a rate match pattern (ratematchpattern), zero power-channel state information-reference signal resource (ZP-CSI-RS) configuration, a frequency domain resource allocation mode, or a time domain resource allocation mode.

It should be noted that if PDSCH-Config is not configured, the UE receives the PDSCH information using the same configuration as the serving cell by default.

In some examples, PUCCH-Config represents the configuration information for the UE to transmit the PUCCH information to the neighboring cell, and the PUCCH includes at least one of the following: a PUCCH resource, a PUCCH format, spatial relation info (spatialrelationinfo) or a list of TCI states configured by a RRC signaling for the PUCCH, one of the spatialrelationinfo or TCI states activated by an MAC CE, or transmission power control parameters of the PUCCH.

It should be noted that if PUCCH-Config is not configured, the UE uses the same configuration as the serving cell to transmit the PUCCH information by default.

In some examples, PUSCH-Config represents the configuration information for the UE to transmit the PUSCH information to the neighboring cell, and the PUSCH includes at least one of the following: an data scrambling identity for the PUSCH (dataScramblingIdentityPUSCH), a data scrambling sequence corresponding to the identity, a transmission mode, DMRS of the PUSCH, power control parameters of the PUSCH, a frequency offset, a frequency domain resource allocating mode, or a time domain resource allocating mode. The transmission mode includes codebook transmission or non-codebook transmission.

It should be noted that if PUSCH-Config is not configured, the UE uses the same configuration as the serving cell to transmit the PUSCH information by default.

In some examples, receiving the configuration information of the neighboring cell from the serving cell includes: receiving the configuration information of the neighboring cell from the serving cell via a RRC signaling.

In some examples, communicating with the neighboring cell based on the first DCI and the configuration information of the neighboring cell, and communicating with the serving cell based on the second DCI, include: transmitting uplink content to the serving cell and/or the neighboring cell, in which the uplink content includes at least one of the following: uplink control information (UCI); or a sounding reference signal (SRS).

The UCI is transmitted by a PUCCH and/or a PUSCH, and the UCI includes at least one of the following: a hybrid automatic repeat request acknowledgement (HARQ-ACK) message; an uplink scheduling request (SR); a beam failure recovery (BFR) request; or a channel state information (CSI) measurement result.

In some examples, the UE transmits a first HARQ-ACK message of the neighboring cell to the serving cell and/or the neighboring cell. The UE transmits a second HARQ-ACK message of the serving cell to the serving cell and/or the neighboring cell. The first HARQ-ACK message of the neighboring cell corresponds to the PDSCH between the UE and the neighboring cell, and the second HARQ-ACK message corresponds to the PDSCH between the UE and the serving cell.

In some examples, the UE transmits a CSI measurement result on the PUCCH/PUSCH of the serving cell and/or the neighboring cell. For example, the UE transmits the CSI measurement result of the serving cell on the PUCCH or PUSCH of the serving cell, and transmits the CSI measurement result of the neighboring cell on the PUCCH or PUSCH of the neighboring cell. Also, the UE transmits the CSI measurement result of the serving cell and the CSI measurement result of the neighboring cell on the PUCCH or PUSCH of the serving cell, or on the PUCCH or PUSCH of the neighboring cell. Further, for example, the UE transmits a result obtained after averaging the CSI measurement result of the serving cell and the CSI measurement result of the neighboring cell, on the PUCCH or PUSCH of the serving cell, or on the PUCCH or PUSCH of the neighboring cell.

In some examples, the CSI measurement result includes at least one of the following: a channel quality indicator (CQI), a rank indication (RI), a precoding matrix indicator (PMI), a layer1-reference signal receive power (L1-RSRP), a layer1-signal to interference plus noise ratio (L1-SINR), a codebook, or an antenna port.

In some examples, communicating with the neighboring cell based on the first DCI and the configuration information of the neighboring cell, and communicating with the serving cell based on the second DCI, include: performing transmission/reception between the UE and the serving cell and between the UE and the neighboring cell using the same HARQ entity and different HARQ processes.

Here, the term "transmission/reception" between the UE and the serving cell and the term "transmission/reception" between the UE and the neighboring cell may be both replaced by PDSCH or PUSCH simultaneously.

In some examples, communicating with the neighboring cell based on the first DCI and the configuration information of the neighboring cell, and communicating with the serving cell based on the second DCI, include: performing transmission/reception between the UE and the serving cell and between the UE and the neighboring cell using different HARQ entities.

Here, the term "transmission/reception" between the UE and the serving cell and the term "transmission/reception" between the UE and the neighboring cell may be both replaced by PDSCH or PUSCH simultaneously.

In some examples, communicating with the neighboring cell based on the first DCI and the configuration information of the neighboring cell, and communicating with the serving cell based on the second DCI, include: performing transmission/reception with the neighboring cell using at least one beams based on the first DCI; and performing transmission/reception with the serving cell using at least one beams based on the second DCI.

Here, the term "transmission/reception" can be either downlink reception or uplink transmission.

In some examples, communicating with the neighboring cell based on the first DCI and the configuration information of the neighboring cell, and communicating with the serving cell based on the second DCI, include: determining a first time domain resource and a first beam direction for receiving first downlink content of the neighboring cell; determining a second time domain resource and a second beam direction for receiving second downlink content of the serving cell; and receiving downlink content with a higher priority in response to the first time domain resource being identical to the second time domain resource.

In order to solve the resource conflict between the serving cell and the neighboring cell, in some examples, the method also includes the following.

The first downlink content includes first PDCCH information, the second downlink content includes second PDCCH information, and a priority of each downlink content is determined based on a first user range of the first PDCCH information and a second user range of the second PDCCH information.

For example, the user range of the DCI transmitted on the PDCCH is that, the PDCCH where the user range of the DCI is cell specific has the highest priority, the PDCCH where the user range of the DCI is group UE specific has the priority lower than the highest priority, and the PDCCH where the user range of the DCI is UE specific has the lowest priority. Generally, the serving cell transmits the three types of PDCCH information, while the neighboring cell only transmits the PDCCH information of the UE specific.

For example, when both the serving cell and the neighboring cell transmit the PDCCH information of the UE specific, the priority is determined based on the service types scheduled by both PDCCHs. For example, the PDCCH that schedules ultra reliable low latency communication (URLLC) service has a higher priority and the PDCCH that schedules enhance mobile broadband (eMBB) service has a lower priority. If the PDCCH of the serving cell and the PDCCH of the neighboring cell have the same priority, the PDCCH information of the serving cell is received first.

In order to solve the resource conflict between the serving cell and the neighboring cell, in some examples, the method also includes the following.

The first downlink content including first PDSCH information of the neighboring cell, and the second downlink content including second PDSCH information of the serving cell, a priority of each downlink content is determined based on a first service type transmitted on a first PDSCH and a second service type transmitted on a second PDSCH.

For example, when both the serving cell and the neighboring cell transmit PDSCH information, the priority is determined based on the service types transmitted on both PDSCHs, such as, the PDSCH that transmits the URLLC service has a higher priority and the PDSCH that transmits the eMBB service has a lower priority. If the serving cell and the neighboring cell transmit services having the same priority, the PDSCH information from the serving cell is received first.

In order to solve the resource conflict between the serving cell and the neighboring cell, in some examples, the method also includes: receiving the downlink content of the serving cell in response to a priority of the first downlink content being identical to a priority of the second downlink content.

In some examples, a priority of downlink content including PDCCH information is higher than a priority of downlink content including PDSCH information.

For example, the first downlink content is information transmitted by the PDCCH and the second downlink content is information transmitted by the PDSCH, or, the first downlink content is information transmitted by the PDSCH and the second downlink content is information transmitted by the PDCCH, the information transmitted by the PDCCH is received first.

In some examples, communicating with the neighboring cell based on the first DCI and the configuration information of the neighboring cell, and communicating with the serving cell based on the second DCI, include: determining a third time domain resource and a third beam direction for transmitting first uplink content to the neighboring cell; determining a fourth time domain resource and a fourth beam direction for transmitting second uplink content to the serving cell; and selecting a transmission power for transmitting uplink content with a higher priority in response to the third time domain resource being identical to the fourth time domain resource.

In order to solve the resource conflict between the serving cell and the neighboring cell, in some examples, the method also includes: in response to the first uplink content including first PUCCH information of the neighboring cell and the second uplink content including second PUCCH information of the serving cell, determining a priority of each uplink content based on content of first UCI transmitted on a first PUCCH and content of second UCI transmitted on a second PUCCH.

For example, if the UE needs to transmit the PUCCH information to different cells, the priority is determined based on the UCI content transmitted by the PUCCH, and the UCI content may include a SR/BFR request, a HARQ-ACK, a SRS or a CSI feedback. The priority of SR/BFR is higher or equal to that of HARQ-ACK, and the priority of HARQ-ACK is higher than that of CSI feedback. Generally, the content of the UCI transmitted to the serving cell includes multiple types of UCIs, while the content of the UCI transmitted to the neighboring cell includes only HARQ-ACK, SRS or CSI feedback. If the content of the UCIs is the same, the transmission power for transmitting the uplink content to the serving cell is preferentially satisfied.

In order to solve the resource conflict between the serving cell and the neighboring cell, in some examples, the method also includes: in response to the first uplink content including first PUSCH information of the neighboring cell and the second uplink content including second PUSCH information of the serving cell, determining a priority of each uplink content based on a third service type transmitted on a first PUSCH and a fourth service type transmitted on a second PUSCH.

For example, when the serving cell and the neighboring cell both transmit the PUSCH information, the priority is determined based on the service types transmitted on both PUSCHs, such as, the PUSCH that transmits the URLLC service has a higher priority and the PUSCH that transmits the eMBB service has a lower priority. If the priorities of the services transmitted by the serving cell and the neighboring cell are the same, the transmission power for transmitting the PUSCH information to the serving cell is preferentially satisfied.

In order to solve the resource conflict between the serving cell and the neighboring cell, in some examples, the method also includes: selecting a transmission power for transmitting the uplink content to the serving cell in response to a priority of the first uplink content being identical to a priority of the second uplink content.

In some examples, a priority of uplink content including PUCCH information is higher than a priority of uplink content including PUSCH information.

For example, the first uplink content is PUCCH information and the second uplink content is PUSCH information, or, the first uplink content is PUSCH information and the second uplink content is PUCCH information, the transmission power for transmitting the PUCCH information is preferentially satisfied.

It should be noted that selecting the transmission power for transmitting the uplink content with the higher priority means that if the transmission power required for transmitting the uplink content with the higher priority is P1, the transmission power required for transmitting the uplink content with the lower priority is P2, and the maximum transmission power of the UE is P, then when P is less than or equal to P1, the transmission power for transmitting the uplink content with the higher priority is set to P, while the transmission power for transmitting the uplink content with the lower priority is set to 0. When P is greater than P1, the transmission power for transmitting the uplink content with the higher priority is set to P1, while the transmission power for transmitting the uplink content with the lower priority is set to 0 or P-P1 or P2.

In some examples, selecting the transmission power for transmitting the uplink content with the higher priority includes: setting a transmission power for transmitting uplink content with a lower priority to 0 in response to the third beam direction being consistent with the fourth beam direction.

Here, the same beam refers to the same beam of the same panel or different beams of the same panel.

In some examples, in response to the third beam direction being consistent with the fourth beam direction, the method further includes: transmitting uplink content to the serving cell or the neighboring cell, and not transmitting the uplink content to the other cell. Since the same panel of the terminal can only point to one beam direction at the same time, the beam can only point to the beam direction of the uplink content with the higher priority to preferentially satisfy the transmission power for transmitting the uplink content with the higher priority, while the transmission power for transmitting the uplink content with the lower priority can only be configured to 0. That is, in this case, due to limitations on the beam, the transmission power for transmitting the uplink content with the lower priority is set to be 0.

In some examples, selecting the transmission power for transmitting the uplink content with the higher priority includes: adding uplink content with a lower priority to the uplink content with the higher priority, and transmitting all the content, in response to the third beam direction being consistent with the fourth beam direction.

Here, the same beam refers to the same beam of the same panel or different beams of the same panel.

In some examples, in response to the third beam direction being consistent with the fourth beam direction, the method further includes: transmitting, the uplink content transmitted to the serving cell and the neighboring cell, on the PUCCH of one of the serving cell and the neighboring cell; or, transmitting, the uplink content transmitted to the serving cell and the neighboring cell, on the PUSCH of one of the serving cell and the neighboring cell.

The technical solution described in this disclosure gives a solution when the serving cell has a conflict with the neighboring cell for scheduling resources, multiple panels in multiple cells can dynamically switch beams when simultaneously transmitting to the UE/receiving from the UE to communicate with the UE, thereby increasing the throughput of the UE.

Figure 3:
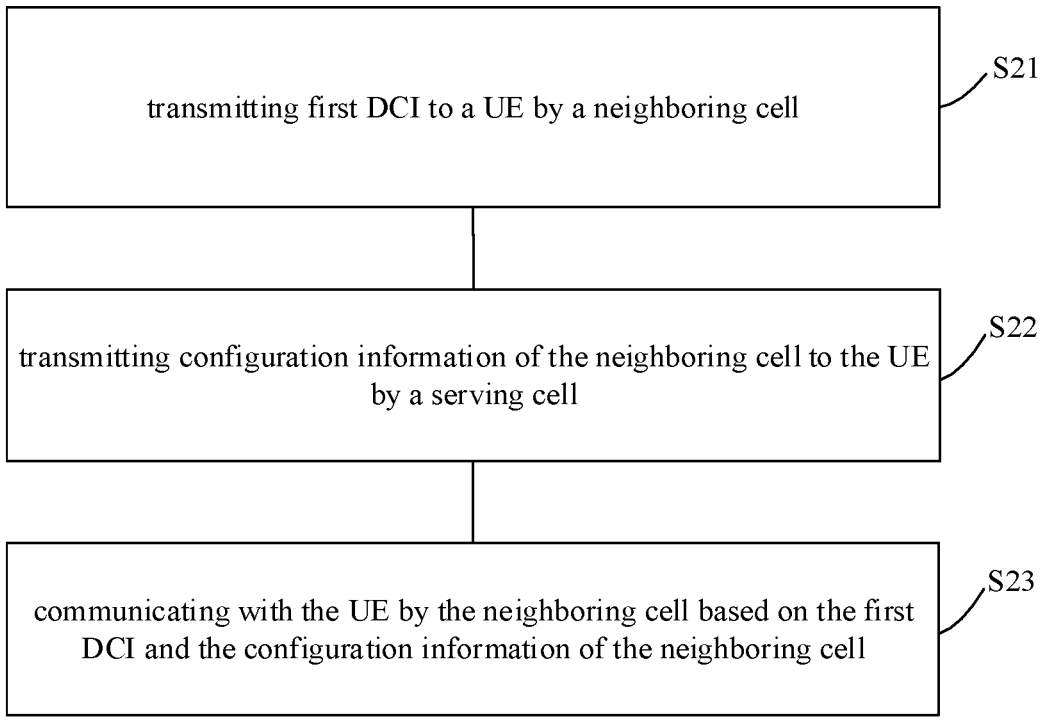
FIG. 3 is a second flowchart of a communication method according to some examples.

Some examples illustrate a communication method, as illustrated in FIG. 3, and the communication method is applied in a network device and includes the following.

At block S21, first DCI is transmitted to a UE via a neighboring cell.

At block S22, configuration information of the neighboring cell is transmitted to the UE via a serving cell.

At block S23, communicating with the UE is performed via the neighboring cell based on the first DCI and the configuration information of the neighboring cell.

It should be noted that the disclosure does not limit the order in which steps S21 and S22 are performed. In practice, step S21 and step S22 may be performed simultaneously, step S21 may also be performed before step S22, or step S22 may also be performed after step S21.

In some examples, the configuration information of the neighboring cell includes at least one of the following: a cell index of the neighboring cell or a sequence indicating the cell index; a device index allocated by the neighboring cell to the UE, in which the device index is configured to distinguish the UE from other UEs located in the neighboring cell; configuration information for the UE to receive PDCCH information from the neighboring cell; configuration information for the UE to receive PDSCH information from the neighboring cell; configuration information for the UE to transmit PUCCH information to the neighboring cell; or configuration information for the UE to transmit PUSCH information to the neighboring cell.

Figure 4:
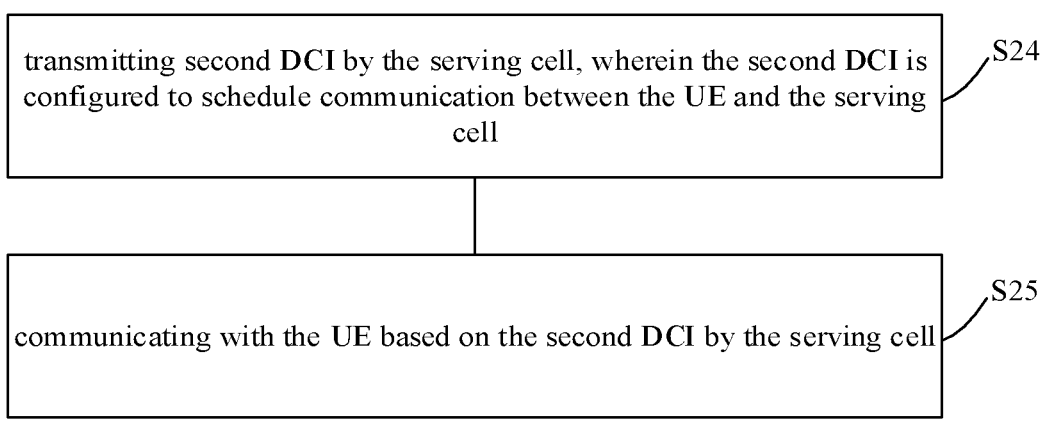
FIG. 4 is a third flowchart of a communication method according to some examples.

In some examples, as illustrated in FIG. 4, the method further includes the following.

At block S24, second DCI is transmitted via the serving cell, and the second DCI is configured to schedule communication between the UE and the serving cell.

At block S25, communicating with the UE is performed based on the second DCI via the serving cell.

It should be noted that the disclosure does not limit the order of execution of step S24 and step S22. In practice, step S24 and step S22 may be performed simultaneously, step S24 may also be performed before step S22, or step S24 may also be performed after step S22.

According to the technical solution described in this disclosure, the network device where the neighboring cell of the UE is located transmits the first DCI to the UE and communicates with the UE according to the first DCI. The network device where the serving cell of the UE is located transmits the second DCI and the configuration information of the neighboring cell to the UE and communicates with the UE according to the second DCI. Therefore, multiple panels in multiple cells can dynamically switch beams when multiple panels of the serving cell and the neighboring cell simultaneously transmit to the UE/receive from the UE to communicate with the UE, so that the communication between the neighboring cell and the UE can also achieve the better effect and the throughput and the user experience can be improved.

Figure 5:
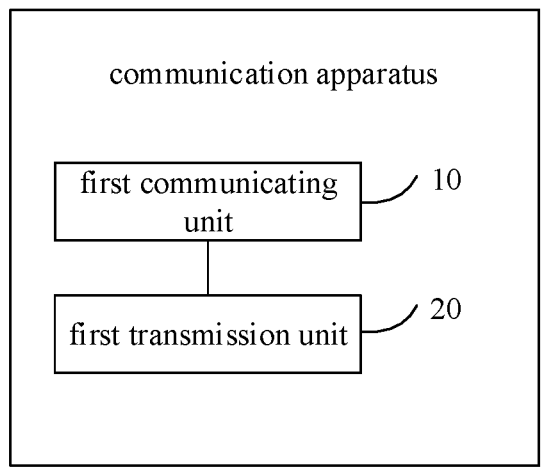
FIG. 5 is a first block diagram of a communication apparatus according to some examples.

Corresponding to the communication method for the UE side, examples of the disclosure also provide a communication apparatus for the UE. As illustrated in FIG. 5, the apparatus includes a first communicating unit 10 and a first transmission unit 20.

The first communicating unit 10 is configured to receive first DCI of a neighboring cell, and receive configuration information of the neighboring cell from a serving cell.

The first transmission unit 20 is configured to communicate with the neighboring cell based on the first DCI and the configuration information of the neighboring cell.

In some examples, the first communicating unit 10 is further configured to receive second DCI from the serving cell. The first transmission unit 20 is further configured to communicate with the serving cell based on the second DCI. Regarding the apparatus in the above examples, the specific way in which each module performs its operation has been described in detail in examples concerning the method, and will not be described in detail here.

In practice, the specific structure of both the first communicating unit 10 and the first transmission unit 20 described above can be implemented by a central processing unit (CPU), a micro controller unit (MCU), a digital signal processor (DSP), or a programmable logic controller (PLC) in the communication apparatus or the UE of the communication apparatus.

The communication apparatus described in some examples may be provided on the UE side.

It should be understood by those skilled in the art that the function of each processing module in the communication apparatus of the disclosure refers to relevant description of the communication method for the UE side, and that each processing module in the communication apparatus of the disclosure can be realized by an analog circuit that implements the functions described in the disclosure, or by software that performs the functions described in the disclosure when running on the terminal.

The communication apparatus described in some examples enables the multiple panels of the multiple cells to dynamically switch beams to transmit to the UE/receive from the UE when the multiple panels of the serving cell and the neighboring cell transmit to the UE/receive from the UE at the same time, so that the communication between the neighboring cell and the UE can also achieve the better effect and the throughput and the user experience can be improved.

Figure 6:
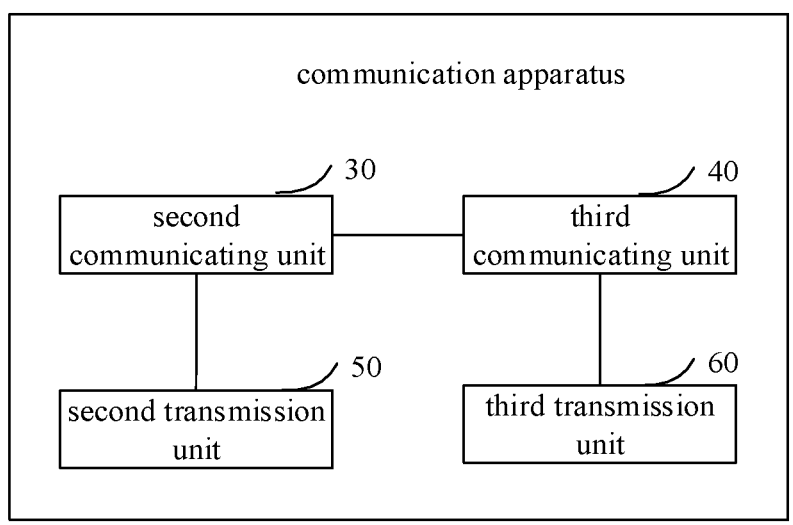
FIG. 6 is a second block diagram of a communication apparatus according to some examples.

Corresponding to the communication method for the network device side, examples of the disclosure also provide a communication apparatus for use in a network device, as illustrated in FIG. 6, and the apparatus includes: a second communicating unit 30, a third communicating unit 40 and a second transmission unit 50.

The second communicating unit 30 is configured to transmit first DCI to a UE via a neighboring cell.

The third communicating unit 40 is configured to transmit configuration information of the neighboring cell to the UE via a serving cell.

The second transmission unit 50 is configured to communicate with the UE via the neighboring cell based on the first DCI and the configuration information of the neighboring cell.

In some examples, the third communicating unit 40 is further configured to transmit second DCI to the UE by the serving cell, in which the second DCI is configured to schedule communication between the UE and the serving cell.

The apparatus further includes: a third transmission unit 60, configured to communicate with the UE based on the second DCI by the serving cell.

Regarding the apparatus in the above examples, the specific way in which each module performs its operation has been described in detail in examples concerning the method, and will not be described in detail here.

In practice, the specific structures of the above-mentioned second communicating unit 30, the third communicating unit 40, the second transmission unit 50 and the third transmission unit 60 can all be implemented by a CPU, a MCU, a DSP or a PLC in the apparatus or the device of the apparatus.

In practice, the second communicating unit 30 and the second transmission unit 50 may generate a part of the network device in which the neighboring cell is located.

In practice, the third communicating unit 40 and the third transmission unit 60 may generate a part of the network device in which the serving cell is located.

It should be understood by those skilled in the art that the function of each processing module in the communication apparatus of the disclosure refers to relevant description of the communication method in FIGS. 3 and 4, and that each processing module in the communication apparatus of the disclosure can be realized by an analog circuit that implements the functions described in the disclosure, or by software that performs the functions described in the disclosure when running on the device.

The communication apparatus described in some examples transmits the first DCI to the UE by the neighboring cell to communicate with the UE based on the first DCI, and transmits the second DCI and the configuration information of the neighboring cell to the UE by the serving cell to communicate with the UE based on the second DCI. Therefore, when the multiple panels of the serving cell and the neighboring cell transmit to the UE/receive from the UE at the same time, the multiple panels in multiple cells can dynamically switch beams to transmit to the UE/receive from the UE, so that the better communication effect between the neighboring cell and the UE is achieved, thereby improving the throughput and the user experience.

Figure 7:
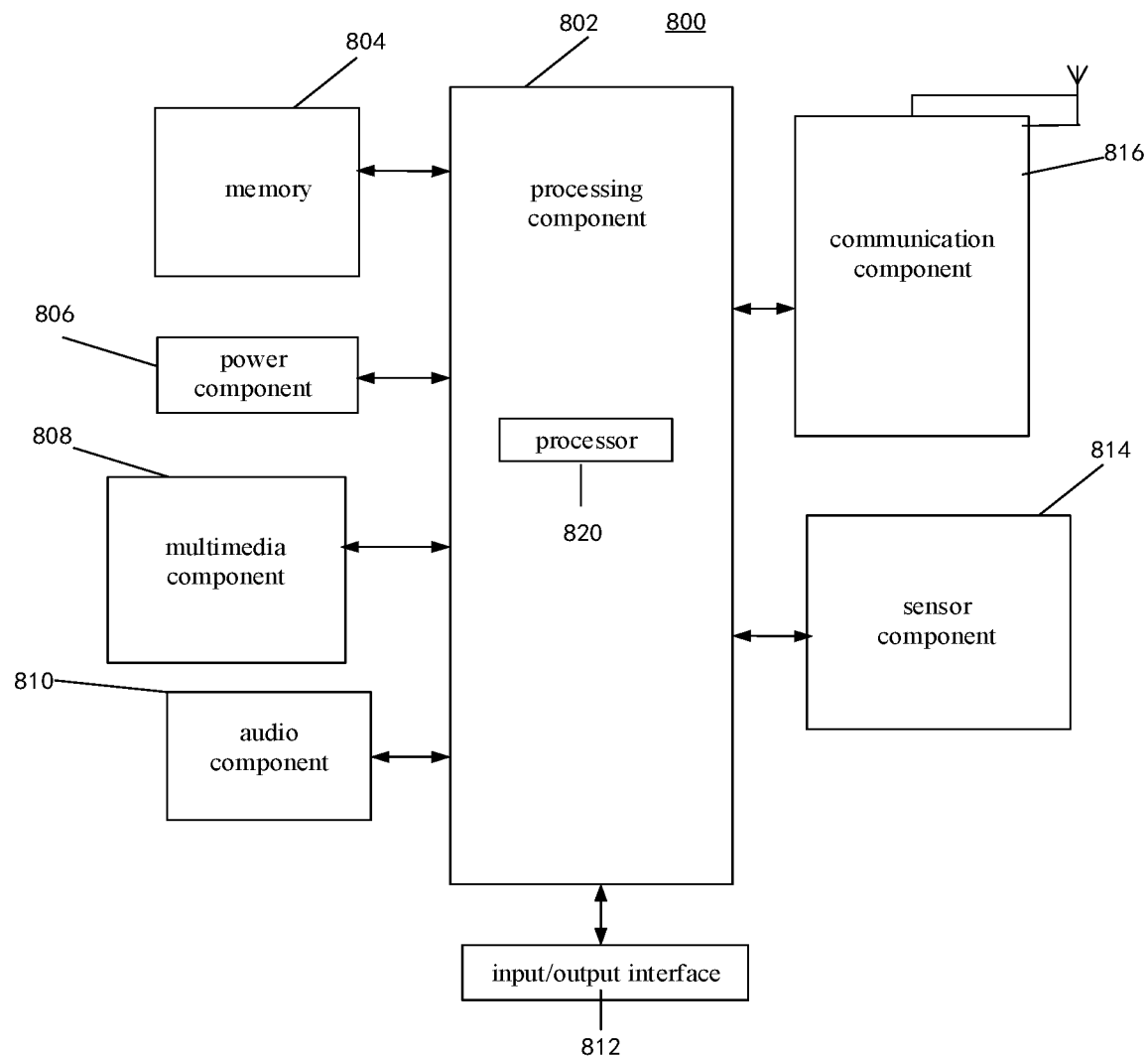
FIG. 7 is a block diagram of a communication device 800 according to some examples.

FIG. 7 is a block diagram of a communication device 800 according to some examples. For example, the device 800 may be a mobile phone, a computer, a digital broadcasting terminal, a message transceiver device, a game console, a tablet device, a medical device, a fitness device or a personal digital assistant.

As illustrated in FIG. 7, the device 800 may include at least one of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include at least one processor 820 to perform all or part of the steps in the above described methods. Moreover, the processing component 802 may include at least one module which facilitate the interaction between the processing component 802 and other components. For example, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random-access memory (SRAM), an electrically-erasable programmable read only memory (EEPROM), an erasable programmable read only memory (EPROM), a programmable read-only memory (PROM), a read only memory (ROM), a magnetic memory, a flash memory, a magnetic or optical disk.

The power component 806 provides power to various components of the device 800. The power component 806 may include a power management system, at least one power source, and any other components associated with the generation, management, and distribution of power in the device 800.

The multimedia component 808 includes a screen providing an output interface between the device 800 and the user. In some examples, the screen may include a liquid crystal display (LCD) and a touch panel (TP). If the screen includes the touch panel, the screen may be implemented as a touch screen to receive input signals from the user. The touch panel includes at least one touch sensor to sense touches, swipes, and gestures on the touch panel. The touch sensors may not only sense a boundary of a touch or swipe action, but also sense a period of time and a pressure associated with the touch or swipe action. In some examples, the multimedia component 808 includes a front-facing camera and/or a rear-facing camera. When the device 800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC) configured to receive an external audio signal when the device 800 is in an operation mode, such as a call mode, a recording mode, and a voice recognition mode. The received audio signal may be further stored in the memory 804 or transmitted via the communication component 816. In some examples, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes at least one sensor to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a complementary metal oxide semiconductor (CMOS) or charge-coupled device (CCD) image sensor, for use in imaging applications. In some examples, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G, or 3G, or a combination thereof. In some examples, the communication component 816 receives a broadcast signal or broadcast associated information from an external broadcast management system via a broadcast channel. In some examples, the communication component 816 further includes a near field communication (NFC) module to facilitate short-range communication. For example, the NFC module may be implemented based on a radio frequency identification (RFID) technology, an infrared data association (IrDA) technology, an ultra-wide band (UWB) technology, a blue tooth (BT) technology, and other technologies.

In exemplary examples, the device 800 may be implemented with at least one application specific integrated circuit (ASIC), digital signal processor (DSP), digital signal processing device (DSPD), programmable logic device (PLD), field programmable gate array (FPGA), controller, micro-controller, microprocessor or other electronic components, for performing the above described methods.

In examples, there is also provided a non-transitory computer readable storage medium including executable instructions, such as the memory 804, executable by the processor 820 in the device 800, for performing the above method. For example, the non-transitory computer-readable storage medium may be a ROM, a Random Access Memory (RAM), a CD-ROM, a magnetic tape, a floppy disc, and an optical data storage device.

Figure 8:
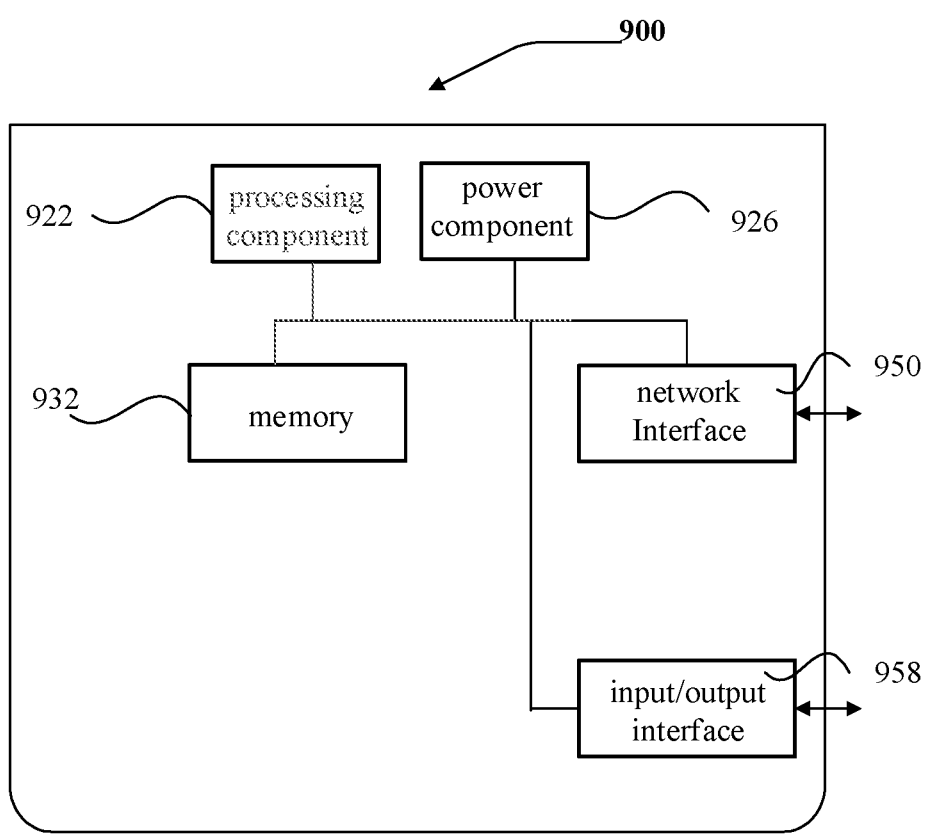
FIG. 8 is a block diagram of a communication device 900 according to some examples.

FIG. 8 is a block diagram of a communication device 900 according to some examples. For example, the device 900 may be provided as a server. As illustrated in FIG. 8, the device 900 includes a processing component 922, which includes at least one processors, and a memory resource represented by a memory 932 for storing instructions executable by the processing component 922, such as application programs. The application program stored in the memory 932 may include at least one modules, each module corresponds to a set of instructions. In addition, the processing component 922 is configured to execute instructions to perform the above methods.

The device 900 may also include a power component 926 configured to perform power management of the device 900, a wired or wireless network interface 950 configured to connect the device 900 to the network, and an I/O interface 958. The device 900 may operate based on an operating system stored on the memory 932, such as Windows Server™, Mac OS X™, Unix™, Linux™, FreeBSD™ or the like.

The technical solution described in examples of the disclosure may be combined arbitrarily without conflict.

Other examples of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A communication method, comprising:
   receiving, by a user equipment (UE), first downlink control information (DCI) from a neighboring cell;
   receiving, by the UE, configuration information of the neighboring cell from a serving cell;
   communicating, by the UE, with the neighboring cell based on the first DCI and the configuration information of the neighboring cell, wherein the first DCI carries first beam information for communicating with the neighboring cell; and
   receiving, by the UE, second DCI from the serving cell, and communicating with the serving cell based on the second DCI, wherein the second DCI carries second beam information for communicating with the serving cell,
   wherein the configuration information of the neighboring cell comprises at least one of the following information:
   configuration information for the UE to receive physical downlink control channel (PDCCH) information from the neighboring cell; or
   configuration information for the UE to receive physical downlink shared channel (PDSCH) information from the neighboring cell,
   wherein communicating with the neighboring cell based on the first DCI and the configuration information of the neighboring cell, and communicating with the serving cell based on the second DCI, comprise:
   transmitting, by the UE, a first hybrid automatic repeat request acknowledgement (HARQ-ACK) message corresponding to PDSCH reception from the neighboring cell to at least one of the serving cell or the neighboring cell; and
   transmitting, by the UE, a second HARQ-ACK message corresponding to PDSCH reception from the serving cell to at least one of the serving cell or the neighboring cell;
   wherein the first and second HARQ-ACK messages are comprised in uplink control information (UCI), and the UCI is transmitted by at least one of a physical uplink control channel (PUCCH) or a physical uplink shared channel (PUSCH),
   wherein transmission or reception is performed between the UE and the serving cell and between the UE and the neighboring cell using a single HARQ entity in the UE and different HARQ processes.

2. The method as claimed in claim 1, wherein the first beam information and the second beam information are indicated by transmission configuration indication (TCI) states or spatial relation information, respectively.

3. The method as claimed in claim 1, wherein the configuration information of the neighboring cell further comprises at least one of the following information:
   a cell index of the neighboring cell and a sequence indicating the cell index;
   a device index allocated by the neighboring cell to the UE, wherein the device index is configured to distinguish the UE from other UEs located in the neighboring cell;
   configuration information for the UE to transmit physical uplink control channel (PUCCH) information to the neighboring cell; or
   configuration information for the UE to transmit physical uplink shared channel (PUSCH) information to the neighboring cell.

4. The method as claimed in claim 1, wherein communicating with the neighboring cell based on the first DCI and the configuration information of the neighboring cell, and communicating with the serving cell based on the second DCI, comprise:
   transmitting uplink content to the serving cell and/or the neighboring cell, wherein the uplink content comprises a sounding reference signal (SRS).

5. The method as claimed in claim 4, wherein the UCI comprises at least one of the following:
   an uplink scheduling request (SR);
   a beam failure recovery (BFR) request; or
   a channel state information (CSI) measurement result.

6. The method as claimed in claim 1, wherein communicating with the neighboring cell based on the first DCI and the configuration information of the neighboring cell, and communicating with the serving cell based on the second DCI, comprise:
   determining a first time domain resource and a first beam direction for receiving first downlink content of the neighboring cell;
   determining a second time domain resource and a second beam direction for receiving second downlink content of the serving cell; and receiving downlink content with a higher priority in response to the first time domain resource being identical to the second time domain resource.

7. The method as claimed in claim 6, wherein, the first downlink content comprises first physical downlink control channel (PDCCH) information, the second downlink content comprises second PDCCH information, and the method further comprises: determining a priority of each downlink content based on a first user range of the first PDCCH information and a second user range of the second PDCCH information; or the first downlink content comprises first physical downlink shared channel (PDSCH) information of the neighboring cell, and the second downlink content comprises second PDSCH information of the serving cell, and the method further comprises: determining a priority of each downlink content based on a first service type transmitted on a first PDSCH and a second service type transmitted on a second PDSCH.

8. The method as claimed in claim 6, further comprising: receiving the downlink content of the serving cell in response to a priority of the first downlink content being identical to a priority of the second downlink content.

9. The method as claimed in claim 6, wherein, a priority of downlink content comprising PDCCH information is higher than a priority of downlink content comprising PDSCH information.

10. The method as claimed in claim 1, wherein communicating with the neighboring cell based on the first DCI and the configuration information of the neighboring cell, and communicating with the serving cell based on the second DCI, comprise:
determining a third time domain resource and a third beam direction for transmitting first uplink content to the neighboring cell;
determining a fourth time domain resource and a fourth beam direction for transmitting second uplink content to the serving cell; and
selecting transmission power for transmitting uplink content with a higher priority in response to the third time domain resource being identical to the fourth time domain resource.

11. The method as claimed in claim 10, further comprising:
in response to the first uplink content comprising first physical uplink control channel (PUCCH) information of the neighboring cell and the second uplink content comprising second PUCCH information of the serving cell, determining a priority of each uplink content based on content of first UCI transmitted on a first PUCCH and content of second UCI transmitted on a second PUCCH, or
in response to the first uplink content comprising first physical uplink shared channel (PUSCH) information of the neighboring cell and the second uplink content comprising second PUSCH information of the serving cell, determining a priority of each uplink content based on a third service type transmitted on a first PUSCH and a fourth service type transmitted on a second PUSCH.

12. The method as claimed in claim 10, further comprising:
selecting a transmission power for transmitting the uplink content to the serving cell in response to a priority of the first uplink content being identical to a priority of the second uplink content.

13. The method as claimed in claim 10, wherein, a priority of uplink content comprising PUCCH information is higher than a priority of uplink content comprising PUSCH information.

14. The method as claimed in claim 10, wherein selecting the transmission power for transmitting the uplink content with the higher priority comprises:
setting a transmission power for transmitting uplink content with a lower priority to 0 in response to the third beam direction being consistent with the fourth beam direction, or
adding uplink content with a lower priority to the uplink content with the higher priority, and transmitting all the uplink content, in response to the third beam direction being consistent with the fourth beam direction.

15. A communication method, comprising:
transmitting, by a network device, first downlink control information (DCI) to a user equipment (UE) via a neighboring cell;
transmitting, by the network device, configuration information of the neighboring cell to the UE via a serving cell;
communicating, by the network device, with the UE via the neighboring cell based on the first DCI and the configuration information of the neighboring cell, wherein the first DCI carries first beam information for communicating with the neighboring cell,
transmitting second DCI via the serving cell, wherein the second DCI is configured to schedule communication between the UE and the serving cell, wherein the second DCI carries second beam information for communicating with the serving cell; and
communicating with the UE based on the second DCI via the serving cell,
wherein the configuration information of the neighboring cell comprises at least one of following information:
configuration information for the UE to receive physical downlink control channel (PDCCH) information from the neighboring cell; or
configuration information for the UE to receive physical downlink shared channel (PDSCH) information from the neighboring cell,
wherein communicating with the UE via at least one of the serving cell or the neighboring cell comprises:
receiving, by the network device and from the UE, a first hybrid automatic repeat request acknowledgement (HARQ-ACK) message corresponding to PDSCH reception from the neighboring cell via at least one of the serving cell and/or the neighboring cell; and
receiving, by the network device and from the UE, a second HARQ-ACK message corresponding to PDSCH reception from the serving cell via at least one of the serving cell and/or the neighboring cell;
wherein the first and second HARQ-ACK messages are comprised in uplink control information (UCI), and the UCI is transmitted by at least one of a physical uplink control channel (PUCCH) or a physical uplink shared channel (PUSCH),
wherein transmission or reception between the UE and the serving cell and between the UE and the neighboring cell is performed using a single HARQ entity in the UE and different HARQ processes.

16. A communication device, applicable to a user equipment (UE), comprising:
a processor;
a memory for storing executable instructions; wherein, the processor is configured to, when executing the executable instructions:

receive first downlink control information (DCI) from a neighboring cell;

receive configuration information of the neighboring cell from a serving cell;

communicate with the neighboring cell based on the first DCI and the configuration information of the neighboring cell, wherein the first DCI carries first beam information for communicating with the neighboring cell; and receive second DCI from the serving cell, and communicate with the serving cell based on the second DCI, wherein the second DCI carries second beam information for communicating with the serving cell, wherein the configuration information of the neighboring cell comprises at least one of following information:

configuration information for the UE to receive physical downlink control channel (PDCCH) information from the neighboring cell; or configuration information for the UE to receive physical downlink shared channel (PDSCH) information from the neighboring cell, wherein the processor is further configured to:

transmit a first hybrid automatic repeat request acknowledgement (HARQ-ACK) message corresponding to PDSCH reception from the neighboring cell to at least one of the serving cell or the neighboring cell; and transmit a second HARQ-ACK message corresponding to PDSCH reception from the serving cell to at least one of the serving cell or the neighboring cell;

wherein the first and second HARQ-ACK messages are comprised in uplink control information (UCI), and the UCI is transmitted by at least one of a physical uplink control channel (PUCCH) or a physical uplink shared channel (PUSCH), wherein transmission or reception is performed between the UE and the serving cell and between the UE and the neighboring cell using a single HARQ entity in the UE and different HARQ processes.

17. A communication device, applicable to a network device, comprising:

a processor;

a memory for storing executable instructions; wherein, the processor is configured to perform the communication method according to claim 15 when executing the executable instructions.

* * * * *